(12) United States Patent
Wilson et al.

(10) Patent No.: US 8,543,540 B1
(45) Date of Patent: Sep. 24, 2013

(54) SYSTEM AND METHOD FOR THE MERGING OF DATABASES

(75) Inventors: Todd Christopher Wilson, Columbus, OH (US); Necip Berme, Worthington, OH (US)

(73) Assignee: Bertec Corporation, Columbus, OH (US)

( * ) Notice: Subject to any disclaimer, the term of this patent is extended or adjusted under 35 U.S.C. 154(b) by 0 days.

(21) Appl. No.: 13/467,472

(22) Filed: May 9, 2012

(51) Int. Cl.
*G06F 7/00* (2006.01)

(52) U.S. Cl.
USPC .......................................................... 707/626

(58) Field of Classification Search
USPC .................................................. 707/610–616
See application file for complete search history.

(56) References Cited

U.S. PATENT DOCUMENTS

| | | | |
|---|---|---|---|
| 4,631,673 A | 12/1986 | Haas et al. | |
| 5,628,004 A | 5/1997 | Gormley et al. | |
| 5,721,909 A | 2/1998 | Oulid-Aissa et al. | |
| 5,806,074 A * | 9/1998 | Souder et al. | 1/1 |
| 5,862,327 A | 1/1999 | Kwang et al. | |
| 5,870,765 A | 2/1999 | Bauer et al. | |
| 5,873,096 A | 2/1999 | Lim et al. | |
| 5,899,998 A | 5/1999 | McGauley et al. | |
| 5,924,094 A | 7/1999 | Sutter | |
| 5,937,414 A | 8/1999 | Souder et al. | |
| 5,956,719 A * | 9/1999 | Kudo et al. | 707/610 |
| 6,016,478 A | 1/2000 | Zhang et al. | |
| 6,038,488 A | 3/2000 | Barnes et al. | |
| 6,113,237 A | 9/2000 | Ober et al. | |
| 6,125,369 A | 9/2000 | Wu et al. | |
| 6,152,564 A | 11/2000 | Ober et al. | |
| 6,223,187 B1 | 4/2001 | Boothby et al. | |
| 6,295,541 B1 * | 9/2001 | Bodnar et al. | 1/1 |
| 6,295,878 B1 | 10/2001 | Berme | |
| 6,354,155 B1 | 3/2002 | Berme | |

(Continued)

FOREIGN PATENT DOCUMENTS

| | | |
|---|---|---|
| CA | 2375260 A1 | 9/2000 |
| EP | 1024441 A2 | 8/2000 |

(Continued)

OTHER PUBLICATIONS

First office action on the merits (Non-Final Rejection) in U.S. Appl. No. 13/775,159, mailed on Jul. 3, 2013.

*Primary Examiner* — Fred I Ehichioya
*Assistant Examiner* — Richard Bowen
(74) *Attorney, Agent, or Firm* — The Law Office of Patrick F. O'Reilly III, LLC

(57) ABSTRACT

A system and method for merging a first database with a second database (one-way merge), and a system and method for merging two databases with one another (two-way merge) is described herein. During the one-way merge, new or updated records are transferred from a copy of a client database to a server database after it is determined that the server database either does not contain one or more records in the copy of the client database or contains an older version of one or more records in the copy of the client database. During the two-way merge, new or updated records are transferred between a client database and a server database after it is determined that either the client database or the server database does not contain one or more records in the other database or contains an older version of one or more records in the other database.

10 Claims, 9 Drawing Sheets

(Two-Way Merge)

(56) References Cited

U.S. PATENT DOCUMENTS

| | | |
|---|---|---|
| 6,389,883 B1 | 5/2002 | Berme et al. |
| 6,446,092 B1 | 9/2002 | Sutter |
| 6,460,051 B1 | 10/2002 | LaRue et al. |
| 6,470,329 B1 | 10/2002 | Livschitz |
| 6,516,327 B1 | 2/2003 | Zondervan et al. |
| 6,535,892 B1 | 3/2003 | LaRue et al. |
| 6,539,381 B1 * | 3/2003 | Prasad et al. ............... 1/1 |
| 6,633,924 B1 * | 10/2003 | Wu et al. .................. 719/328 |
| 6,718,348 B1 * | 4/2004 | Novak et al. ............... 707/621 |
| 6,915,312 B2 * | 7/2005 | Bodnar et al. ............. 707/624 |
| 6,936,016 B2 | 8/2005 | Berme et al. |
| 7,222,141 B2 | 5/2007 | Zondervan et al. |
| 7,487,186 B2 | 2/2009 | Shimshoni |
| 7,490,112 B1 | 2/2009 | Suresh et al. |
| 7,606,881 B2 * | 10/2009 | Chasman et al. ........... 709/221 |
| 7,617,540 B2 | 11/2009 | Kim et al. |
| 7,953,794 B2 * | 5/2011 | Clarke et al. ............... 709/204 |
| 7,966,287 B2 | 6/2011 | Brown |
| 8,181,541 B2 | 5/2012 | Berme |
| 2005/0099963 A1 | 5/2005 | Multer et al. |
| 2005/0149582 A1 * | 7/2005 | Wissmann et al. .......... 707/201 |
| 2005/0184857 A1 * | 8/2005 | Roatis et al. ................ 340/5.73 |
| 2006/0161516 A1 * | 7/2006 | Clarke et al. ............... 707/2 |
| 2007/0282848 A1 * | 12/2007 | Kiilerich et al. ............ 707/10 |
| 2008/0098042 A1 * | 4/2008 | Tian et al. .................. 707/201 |
| 2008/0120270 A1 | 5/2008 | Lamberts |
| 2008/0144624 A1 * | 6/2008 | Marcondes et al. ......... 370/392 |
| 2008/0163743 A1 * | 7/2008 | Freedman ................... 84/609 |
| 2008/0228110 A1 | 9/2008 | Berme |
| 2009/0287746 A1 * | 11/2009 | Brown ......................... 707/203 |
| 2010/0274587 A1 | 10/2010 | Gamboa et al. |
| 2011/0277562 A1 | 11/2011 | Berme |
| 2011/0289100 A1 * | 11/2011 | Madhavarapu et al. ..... 707/769 |
| 2012/0030173 A1 * | 2/2012 | Freedman ................... 707/638 |
| 2012/0209808 A1 * | 8/2012 | Tien et al. .................. 707/622 |
| 2012/0239704 A1 * | 9/2012 | O'Farrell et al. ............ 707/802 |

FOREIGN PATENT DOCUMENTS

| | | |
|---|---|---|
| EP | 1131757 B1 | 5/2005 |
| JP | 2000235513 A | 8/2000 |
| JP | 2008537255 A | 9/2008 |
| WO | 2008058927 A2 | 5/2008 |

* cited by examiner (Two-Way Merge)

SYSTEM AND METHOD FOR THE MERGING OF DATABASES

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a system and method for the merging of databases. More particularly, the invention relates to a system and method for merging a first database with a second database (one-way merge), and a system and method for merging two databases with one another (two-way merge).

2. Background

Presently, there are many businesses that utilize mixed office computing systems. In such a system, for example, some of the computers may comprise in-the-field laptops with no network connectivity, whereas other computers may include desktop-based computing systems. Because some of the individual computers in the mixed office system are not connected to one another, and also are not storing all files on a common server (e.g., in-the-field laptops with no network connectivity), there is a great potential for the creation of many disparate copies of the same database. While many of these businesses with disparate copies of the same database do not need real-time data updates, they often desire end-of-the-day database merging wherein the database content of a first computer (e.g., in-the-field laptop with no network connectivity) is merged with the database content of a second computer (e.g., desktop computer).

Existing database systems do not adequately accommodate this particular mixed office distributed model. Some of the conventional database systems are either standalone with no connectivity at all, whereas other conventional database systems require "always-on" network connectivity via a virtual private network (VPN). As such, the traditional database systems do not permit the merging of disparate copies of the same database between computers with intermittent connectivity.

What is needed, therefore, is a system and method for the merging of databases that offers greater flexibility in connectivity, wherein individual computers in the system can be connected on an ad hoc basis to merge the database results when needed, with no requirements for the availability of a network connection. Moreover, a system and method for the merging of databases is needed that can utilized in a disconnected network, wherein a copy of the database can be made on removable media and given, or shipped, to a different system and merged in that fashion. Furthermore, a need exists for a system and method for the merging of databases that can be effectively utilized without compromising the security of a secure computing network.

BRIEF SUMMARY OF THE INVENTION

Accordingly, the present invention is directed to a system and method for the merging of databases that substantially obviates one or more problems resulting from the limitations and deficiencies of the related art.

In accordance with one aspect of the present invention, there is provided a method for merging a first database with a second database, which includes the following steps: (a) providing first and second computing devices having respective first and second databases stored thereon, the first and second databases each comprising one or more records, each of the one or more records having a unique identifier and a timestamp associated therewith; (b) making a copy of the first database available to the second computing device so that the second computing device is capable of reading the first database; (c) comparing, by using the second computing device, a first listing of one or more unique identifiers and timestamps associated with the one or more records in the first database to a second listing of one or more unique identifiers and timestamps associated with the one or more records in the second database; (d) determining, by using the second computing device, whether each of the one or more unique identifiers in the first listing exists in the second listing; (e) when it is determined that one or more unique identifiers in the first listing do not exist in the second listing, copying one or more records associated with the one or more unique identifiers that do not exist from the first database to the second database; (f) when it is determined that one or more unique identifiers in the first listing also exist in the second listing, further determining, by using the second computing device, a most recent version of one or more records associated with the one or more unique identifiers existing in both listings by comparing one or more timestamps in the first listing to one or more timestamps of one or more corresponding records in the second listing; and (g) when it is determined that one or more records in the first listing have a more recent timestamp than one or more corresponding records in the second listing with matching unique identifiers, copying the one or more records having more recent timestamps from the first database to the second database.

In a preferred embodiment of this aspect of the present invention, the method further comprises the steps of: (i) utilizing the first computing device for making a backup copy of the first database, the first computing device storing the backup copy of the first database on a form of electronic media or a shared device; and (ii) utilizing the electronic media or the shared device to make the backup copy of the first database available to the second computing device.

In another preferred embodiment, the one or more unique identifiers comprise one or more globally unique identifiers.

In yet another preferred embodiment, the one or more globally unique identifiers are expressed in hexadecimal notation.

In still another preferred embodiment, the one or more globally unique identifiers comprise one of the following: (i) mathematically random numbers, (ii) mathematically pseudo-random numbers, and (iii) heuristic values based upon a portion of the content in fields of the one or more records.

In yet another preferred embodiment, the one or more timestamps comprise both the dates and times when the one or more records were last modified.

In still another preferred embodiment, the one or more timestamps are expressed in the form of Julian dates.

In yet another preferred embodiment, the first computing device is a client computing device and the second computing device is a server computing device.

In accordance with another aspect of the present invention, there is provided a method for merging two databases with one another, which includes the steps of: (a) providing first and second computing devices having respective first and second databases stored thereon, the first and second databases each comprising one or more records, each of the one or more records having a unique identifier and timestamp associated therewith; (b) connecting the first computing device with the second computing device by utilizing a network connection; (c) sending a first listing of one or more unique identifiers and timestamps associated with the one or more records in the first database from the first computing device to the second computing device; (d) comparing, by using the second computing device, the first listing of the one or more unique identifiers and timestamps associated with the one or more records in the first database to a second listing of one or more unique identifiers and timestamps associated with the one or more records in the second database; (e) determining, by using the second computing device, whether each of the one or more unique identifiers in the first listing exists in the second listing, and whether each of the one or more unique identifiers in the second listing exists in the first listing; (f) when it is determined that one or more unique identifiers in the first listing do not exist in the second listing, adding one or more records associated with the one or more unique identifiers that do not exist to a record request list; (g) when it is determined that one or more unique identifiers in the first listing also exist in the second listing, further determining, by using the second computing device, a most recent version of one or more records associated with the one or more unique identifiers existing in both listings by comparing one or more timestamps in the first listing to one or more timestamps of one or more corresponding records in the second listing; (h) when it is determined that one or more records in the first listing have a more recent timestamp than one or more corresponding records in the second listing with matching unique identifiers, adding the one or more records having more recent timestamps to the record request list; (i) when it is determined that one or more records in the second listing have a more recent timestamp than one or more corresponding records in the first listing with matching unique identifiers, adding the one or more records having more recent timestamps to a record send list; (j) when it is determined that one or more unique identifiers in the second listing do not exist in the first listing, adding one or more records associated with the one or more unique identifiers that do not exist to the record send list; (k) transferring the record request list from the second computing device to the first computing device; (l) exporting the one or more records listed on the record request list from the first computing device to the second computing device; and (m) exporting the one or more records listed on the record send list from the second computing device to the first computing device.

In a preferred embodiment of this aspect of the present invention, the one or more unique identifiers comprise one or more globally unique identifiers.

In another preferred embodiment, the one or more globally unique identifiers are expressed in hexadecimal notation.

In yet another preferred embodiment, the one or more globally unique identifiers comprise one of the following: (i) mathematically random numbers, (ii) mathematically pseudo-random numbers, and (iii) heuristic values based upon a portion of the content in fields of the one or more records.

In still another preferred embodiment, the one or more timestamps comprise both the dates and times when the one or more records were last modified.

In yet another preferred embodiment, the one or more timestamps are expressed in the form of Julian dates.

In still another preferred embodiment, the first computing device is a client computing device and the second computing device is a server computing device.

In yet another preferred embodiment, the network connection is an encrypted network connection.

In accordance with yet another aspect of the present invention, there is provided a system for merging a first database with a second database, which includes: first and second computing devices having respective first and second databases stored thereon, the first and second databases each comprising one or more records, each of the one or more records having a unique identifier and timestamp associated therewith; and a data transfer device configured to make a copy of the first database available to the second computing device so that the second computing device is capable of reading the first database. The second computing device being specially programmed to: (a) compare a first listing of one or more unique identifiers and timestamps associated with the one or more records in the first database to a second listing of one or more unique identifiers and timestamps associated with the one or more records in the second database; (b) determine whether each of the one or more unique identifiers in the first listing exists in the second listing; (c) when it is determined that one or more unique identifiers in the first listing do not exist in the second listing, copy one or more records associated with the one or more unique identifiers that do not exist from the first database to the second database; (d) when it is determined that one or more unique identifiers in the first listing also exist in the second listing, further determine a most recent version of one or more records associated with the one or more unique identifiers existing in both listings by comparing one or more timestamps in the first listing to one or more timestamps of one or more corresponding records in the second listing; and (e) when it is determined that one or more records in the first listing have a more recent timestamp than one or more corresponding records in the second listing with matching unique identifiers, copy the one or more records having more recent timestamps from the first database to the second database.

In accordance with still another aspect of the present invention, there is provided a system for merging two databases with one another, which includes: first and second computing devices having respective first and second databases stored thereon, the first and second databases each comprising one or more records, each of the one or more records having a unique identifier and timestamp associated therewith, the first and second computing devices being operatively connected to one another by a network connection, the first computing device being configured to send a first listing of one or more unique identifiers and timestamps associated with the one or more records in the first database to the second computing device. The second computing device being specially programmed to: (a) compare the first listing of the one or more unique identifiers and timestamps associated with the one or more records in the first database to a second listing of one or more unique identifiers and timestamps associated with the one or more records in the second database; (b) determine whether each of the one or more unique identifiers in the first listing exists in the second listing, and whether each of the one or more unique identifiers in the second listing exists in the first listing; (c) when it is determined that one or more unique identifiers in the first listing do not exist in the second listing, add one or more records associated with the one or more unique identifiers that do not exist to a record request list; (d) when it is determined that one or more unique identifiers in the first listing also exist in the second listing, further determining a most recent version of one or more records associated with the one or more unique identifiers existing in both listings by comparing one or more timestamps in the first listing to one or more timestamps of one or more corresponding records in the second listing; (e) when it is determined that one or more records in the first listing have a more recent timestamp than one or more corresponding records in the second listing with matching unique identifiers, add the one or more records having more recent timestamps to the record request list; (f) when it is determined that one or more records in the second listing have a more recent timestamp than one or more corresponding records in the first listing with matching unique identifiers, add the one or more records having more recent timestamps to a record send list; and (g) when it is determined that one or more unique identifiers in the second listing do not exist in the first listing, add one or more records associated with the one or more unique identifiers that do not exist to the record send list. In this embodiment, the second computing device is configured to transfer the record request list to the first computing device; the first computing device is configured to export the one or more records listed on the record request list to the second computing device, and the second computing device is configured to export the one or more records listed on the record send list to the first computing device.

It is to be understood that the foregoing summary and the following detailed description of the present invention are merely exemplary and explanatory in nature. As such, the foregoing summary and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same components/steps are always denoted using the same reference characters so that, as a general rule, they will only be described once.

DETAILED DESCRIPTION OF THE PREFERRED EMBODIMENTS OF THE INVENTION

The present invention is described herein, in an exemplary manner, with reference to computer system architecture and flowcharts that illustrate exemplary processes carried out by the computer system. In a preferred embodiment, functional blocks of the flowchart illustrations can be implemented by computer system instructions. These computer program instructions may be loaded directly onto an internal data storage device of a computing device (e.g., a hard drive of a computer). Alternatively, these computer program instructions could be stored on a portable computer-readable medium (e.g., a flash drive, a floppy disk, a compact disk, etc.), and then subsequently loaded onto a computing device such that the instructions can be executed thereby. In other embodiments, these computer program instructions could be embodied in the hardware of the computing device, rather than in the software thereof. It is also possible for the computer program instructions to be embodied in a combination of both the hardware and the software.

This description describes in general form the computer program(s) required to carry out one-way and two-way merging of databases. Any competent programmer in the field of information technology could develop a system using the description set forth herein.

For the sake of brevity, conventional computer system components, conventional data networking, and conventional software coding will not be described in detail herein. Also, it is to be understood that the connecting lines shown in the block diagram(s) included herein are intended to represent functional relationships and/or operational couplings between the various components. Similarly, connecting lines are also used between the elements of the flowcharts in order to illustrate the functional relationships therebetween. In addition to that which is explicitly depicted, it is to be understood that many alternative or additional functional relationships and/or physical connections may be incorporated in a practical application of the system.

1. Exemplary System

Figure 1:
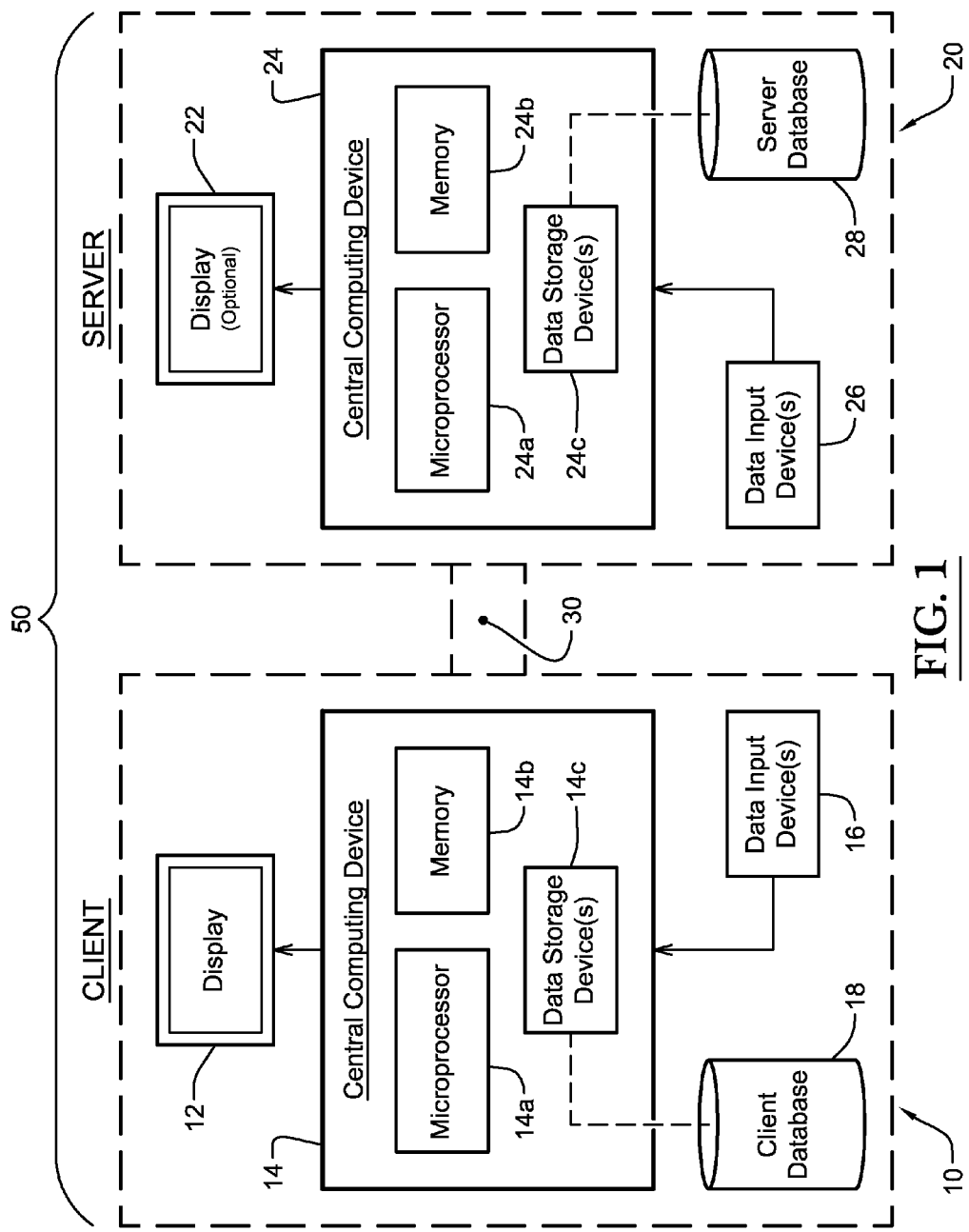
FIG. 1 is a block diagram of an exemplary system for carrying out the merging of databases, according to an embodiment of the invention.

FIG. 1 is a schematic representation of an exemplary computer system 50 for carrying out the merging of databases, according to an embodiment of the invention. The computer system 50 generally comprises a client computing device 10 and a server computing device 20. In some embodiments of the invention, the client computing device 10 and the server computing device 20 are operatively connected to one another via a network connection 30. Preferably, the network connection 30 is an encrypted network connection so that data can be securely transferred between the client computing device 10 and the server computing device 20. The network connection 30 between the computing devices 10, 20 can be a conventional hard-wired connection (e.g., utilizing an Ethernet cable or any other type of suitable data transmission cable), or alternatively, can utilize wireless data transmission technology (e.g., a wireless local area network, commonly referred to as Wi-Fi technology).

However, it is to be understood that a network connection 30 between the computing devices 10, 20 is not required for all embodiments of the invention. In particular, while a network connection 30 is needed for the two-way merge procedure, it is not required for the one-way merge procedure. Rather, in order to carry out the one-way merge procedure hereinafter described, a user can simply make a backup copy of the client database 18 on a form of electronic media (e.g., a flash drive or a compact disk) or a shared device by utilizing the client computing device 10. Then, the user can subsequently make the backup copy of the client database 18 residing on the electronic media or stored device available to the server computing device 20 prior to carrying out the one-way merge procedure.

Referring again to FIG. 1, it can be seen that the client computing device 10 includes a central computing device 14 for collecting, storing, and processing data, as well as a plurality of peripheral devices 12, 16 operatively connected thereto. The peripheral devices preferably include a graphical user interface or display 12 (e.g., a monitor) and a plurality of data input devices 16, such as a keyboard and a mouse. As shown in FIG. 1, the central computing device 14 of the client computing device 10 comprises a microprocessor 14a for processing data, memory 14b (e.g., random access memory or RAM) for storing data during the processing thereof, and data storage device(s) 14c, such as one or more hard drives, compact disk drives, floppy disk drives, flash drives, or any combination thereof. The client database 18 is stored on a medium of the one or more data storage device(s) 14c of the client computing device 10, such as on the medium of the hard drive of the client computing device 10. In some embodiments, the client computing device 10 can be in the form of a laptop computer, while in other embodiments, the client computing device 10 can be embodied as a desktop computer. While, still in other embodiments, the client computing device 10 may be in the form of a palmtop computing device (i.e., a PDA), a tablet computing device, or any other suitable computing device.

Similarly, as further illustrated in FIG. 1, the server computing device 20 includes a central computing device 24 for collecting, storing, and processing data, as well as a plurality of peripheral devices 22, 26 operatively connected thereto. As described above for the client computing device 10, the peripheral devices could include a graphical user interface or display 22 (e.g., a monitor) and a plurality of data input devices 26, such as a keyboard and a mouse. Moreover, like the client computing device 10, the central computing device 24 of the server computing device 20 comprises a microprocessor 24a for processing data, memory 24b (e.g., random access memory or RAM) for storing data during the processing thereof, and data storage device(s) 24c, such as one or more hard drives, compact disk drives, floppy disk drives, flash drives, or any combination thereof. The server database 28 is stored on a medium of the one or more data storage device(s) 24c of the server computing device 20, such as on the medium of the hard drive of the server computing device 20. In some embodiments, the server computing device 20 can be in the form of a desktop computer or a mainframe computer, while in other embodiments, the server computing device 20 can be embodied as a laptop computer. While, still in other embodiments, the server computing device 20 may be in the form of a palmtop computing device (i.e., a PDA), a tablet computing device, or any other suitable computing device.

In another embodiment, the server computing device 20 is in the form of a remote monitoring device that is operatively connected to the client computing device 10 by virtue of a web interface (i.e., a virtual machine). In such an embodiment, the server computing device 20 would not be required to have a display 22, and it could operate without user interaction. Alternatively, the server computing device 20 could provide monitoring and control by means of some user interface (e.g., desktop, remote, web, etc.).

In a preferred embodiment of the invention, one or both of the client database 18 and the server database 28 are encrypted so as to protect the secrecy of the data stored therein. Thus, confidential or proprietary data can be safely stored in the databases 18, 28 without the fear of interception by an unauthorized third party.

2. One-Way Merge Procedure

Figure 2:
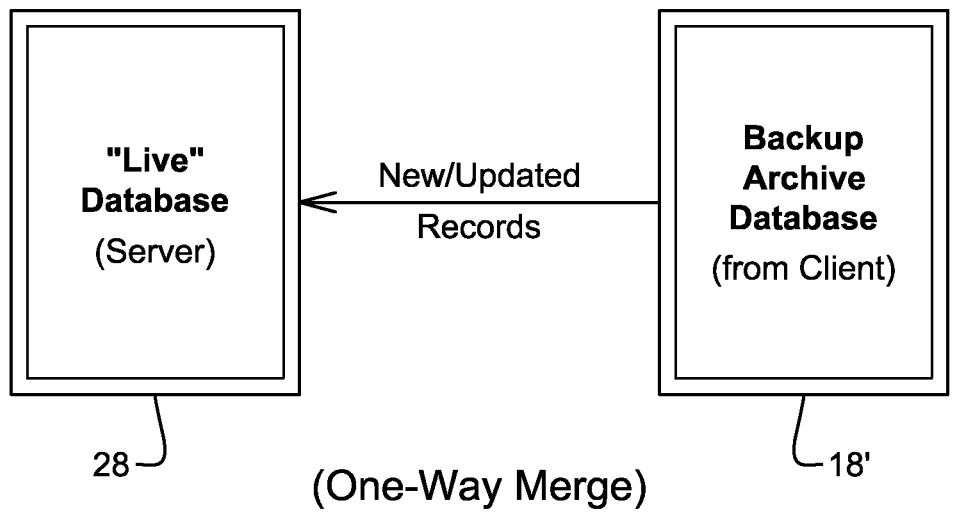
FIG. 2 is a schematic diagram illustrating the merging of a first database with a second database (i.e., a one-way merge), according to an embodiment of the invention.

In FIG. 2, the merging of a first database with a second database (i.e., a one-way merge) is schematically illustrated. In general, during an exemplary one-way merge procedure, new or updated records are transferred from a backup archive database 18' (i.e., a copy of the client database 18) to a "live" database 28 (i.e., the server database) after it is determined that the "live" database 28 either does not contain one or more records in the backup archive database 18' or contains an older version of one or more records in the backup archive database 18'. The records transferred from the backup archive database 18' to the "live" database 28 can comprise various forms of data. For example, the records could include any of the following: (i) operator data for an individual conducting subject testing, (ii) anatomical data for a test subject, (iii) numerical data acquired during the testing of a subject, or (iv) a graphical depiction of a test subject. However, one of ordinary skill in the art will readily appreciate that these are merely examples of the type of content which the records may contain. The claimed invention encompasses all possible forms of record content.

Figure 4:
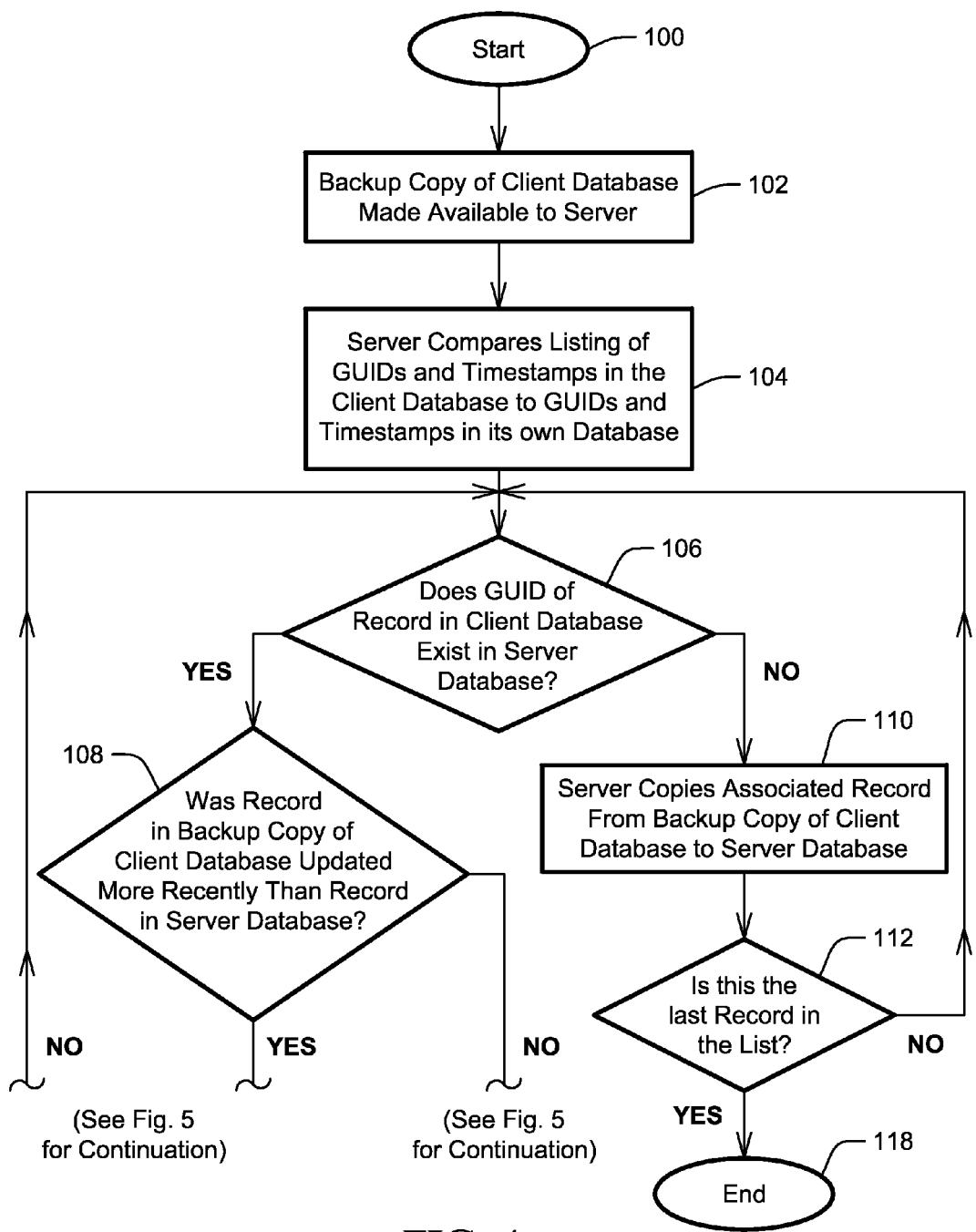
FIG. 4 is a partial flowchart illustrating a one-way merge procedure carried out by the system of FIG. 1, according to an embodiment of the invention.
Figure 5:
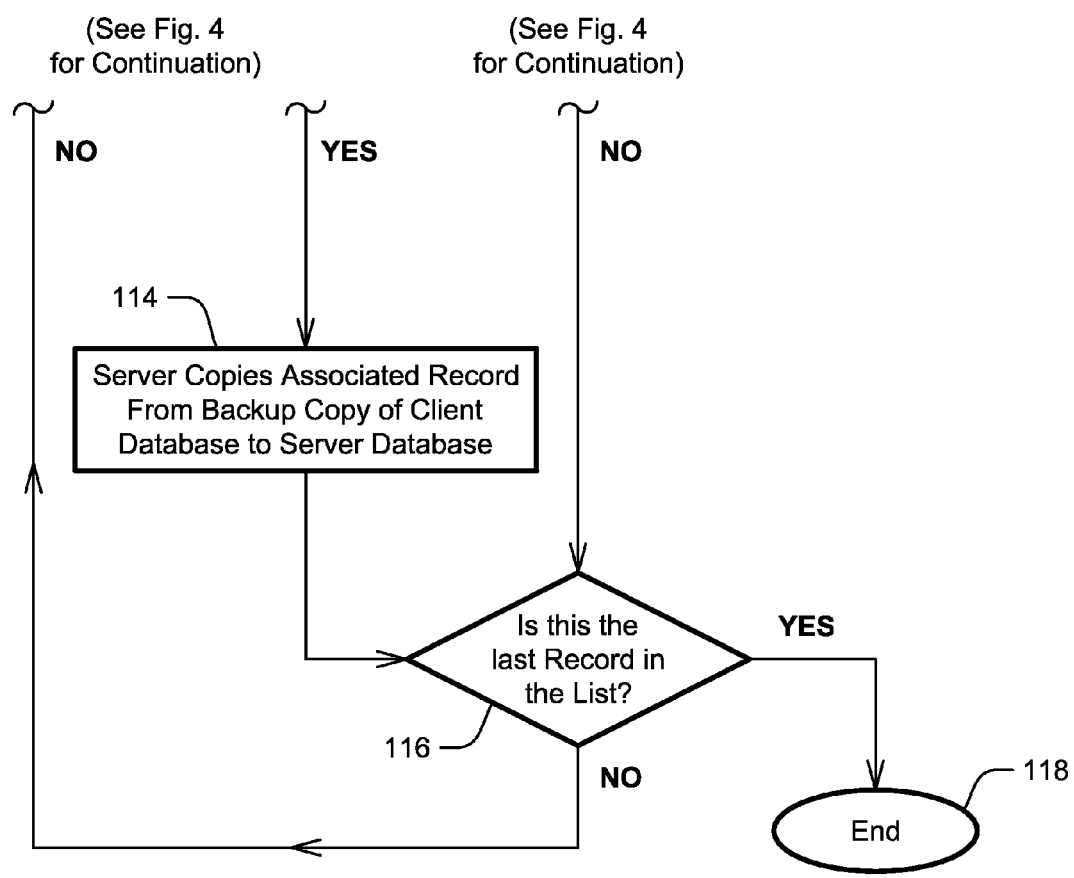
FIG. 5 is a continuation of the flowchart of FIG. 4, which illustrates additional steps of the one-way merge procedure, according to an embodiment of the invention.

In accordance with an embodiment of the invention, a flowchart illustrating a one-way merge procedure carried out by the computer system 50 of FIG. 1 is set forth in FIGS. 4 and 5. Referring initially to FIG. 4, the procedure commences at 100, and in step 102, a backup copy of the client database 18' is made available to the server computing device 20 ("server"). In a preferred embodiment, a data storage/transfer device (e.g., a floppy disk drive, a compact disk (CD) drive, or flash drive) of the client computing device 10 ("client") is utilized for making a backup copy of the entire client database 18 (i.e., not just a portion or subset of the database) by storing the backup copy of the client database 18' on a form of electronic media or a shared device. Then, the electronic media or the shared device is used to make the backup copy of the client database 18' available to the server computing device 20. After which, in step 104, the server compares the listing of globally unique identifiers (GUIDs) and timestamps in the copy of the client database 18' to the listing of globally unique identifiers (GUIDs) and timestamps in its own database (i.e., server database 28).

In step 106 (i.e., decision block 106), the server initially determines whether a GUID identifying a particular record in the copy of client database 18' exists in the server database 28. When it is determined that a GUID identifying a particular record in the copy of the client database 18' does not exist in the server database 28, the server copies the associated record from the backup copy of the client database 18' to the server database 28 (step 110 in FIG. 4). After which, in step 112, the server determines if the copied record is the last record in the copy of the client database 18'. If the copied record is the last record in the client database 18, the process ends at step 118. Otherwise, the determination in step 106 is performed for the next record in the listing of records for the client database 18.

When it is determined that a GUID identifying a particular record in the copy of the client database 18' also exists in the server database 28, the server further determines, in step 108, whether the record in the backup copy of the client database 18' was updated more recently than the corresponding record in the server database 28. In order to determine which version of a particular record was updated more recently, the timestamps of the two versions of the record are compared to one another. The version of the record having the most recent timestamp associated therewith is deemed to be the record that was most recently updated. In this peer-to-peer system, the timestamps associated with the client database 18' are assigned by the client computing device 10, whereas the timestamps associated with the server database 28 are assigned by the server computing device 20. When it is determined that the version of the record in the backup copy of the client database 18' has a more recent timestamp, and thus was updated more recently, than the version of the record in the server database 28, the server copies the associated record from the backup copy of the client database 18' to the server database 28 (step 114 in FIG. 5). After which, in step 116 of FIG. 5, the server determines if the copied record is the last record in the copy of the client database 18'. If the copied record is the last record in the client database 18, the process ends at step 118. Otherwise, the initial determination in step 106 is performed for the next record in the listing of records for the client database 18.

On the other hand, when it is determined that the version of the record in the backup copy of the client database 18' has an older timestamp as compared to the version of the record in the server database 28, the process proceeds directly to step 116 in FIG. 5, wherein the server determines if that particular record is the last record in the copy of the client database 18'. If it is the last record, the process ends at step 118. If not, the initial determination in step 106 is carried out for the next record in the listing of records for the client database 18. The aforedescribed process is performed by the server until each of the records in the copy of the client database 18' is evaluated.

In a preferred embodiment, the globally unique identifiers (GUIDs) utilized for the identification of the records in the client database 18 and the server database 28 comprise a 32-character hexadecimal string, such as {52FC4040-7BCH-8096-C4MM-09001L40407E}, and are stored by the computing devices 10, 20 as 128-bit integers. The hexadecimal digits comprising each GUID can be separated into five groups, each group being separated from adjacent group(s) by means of dashes. In one embodiment, the first group includes eight (8) hexadecimal digits, the second, third, and fourth groups each include four (4) hexadecimal digits, while the fifth group includes twelve (12) hexadecimal digits. Although, one of ordinary skill in the art will appreciate that the hexadecimal string comprising each GUID can utilize a different overall number of characters, different groupings of characters, or a different means of separating the various groups.

In one embodiment of the invention, the globally unique identifiers (GUIDs) can be randomly selected, and may comprise mathematically random numbers or mathematically pseudo-random numbers. While, in another embodiment of the invention, the values for the GUIDs can be based, at least in part, on the content of the fields in the records they are used to designate. For example, the GUIDs could comprise heuristic values based upon a portion of the content in the fields of the records that they represent.

In a preferred embodiment of the invention, the timestamps utilized for indicating the date and time when the records in the client database 18 and the server database 28 were updated are expressed in the form of Julian dates. A Julian date is comprised of the following two parts: (i) the Julian day number, which is the integer part of the Julian date; and (ii) the decimal parts of a Julian date, which are used to denote the time on a particular day. The Julian day number is the number of days that have passed since Jan. 1, 4713 BC (JDN=0) in accordance with the proleptic Julian calendar. The decimal parts of a Julian date are defined as follows:

0.1=2.4 hours, or alternatively 144 minutes or 8640 seconds 0.01=0.24 hours, or alternatively 14.4 minutes or 864 seconds 0.001=0.024 hours, or alternatively 1.44 minutes or 86.4 seconds 0.0001=0.0024 hours, or alternatively 0.144 minutes or 8.64 seconds 0.00001=0.00024 hours, or alternatively 0.0144 minutes or 0.864 seconds.

For example, a Julian date equal to "2455896.10596" corresponds to Wednesday, Nov. 30, 2011 at 14:32:34.9 UT, whereas a Julian date equal to "2455982.13360" corresponds to Friday, Feb. 24, 2012 at 15:12:23.0 UT (or UTC, is the acronym for coordinated universal time).

Advantageously, the utilization of Julian dates for the timestamps provides a consistent format between different locales (e.g., the American and European format is exactly the same). Moreover, the use of Julian dates and coordinated universal time eliminates the issues associated with differing time zones (e.g., it doesn't matter whether the client computing device 10 is located in Columbus, Ohio which is on Eastern Daylight Time (EDT), and the server computing device 20 is located in Los Angeles, Calif., which is on Pacific Daylight Time (PDT)).

In order to advantageously simplify and streamline the merge processes set forth herein, the data in the records is not checked for conflicts. If a record is newer than the record it is replacing, then the older record simply gets replaced.

3. Two-Way Merge Procedure

Figure 3:
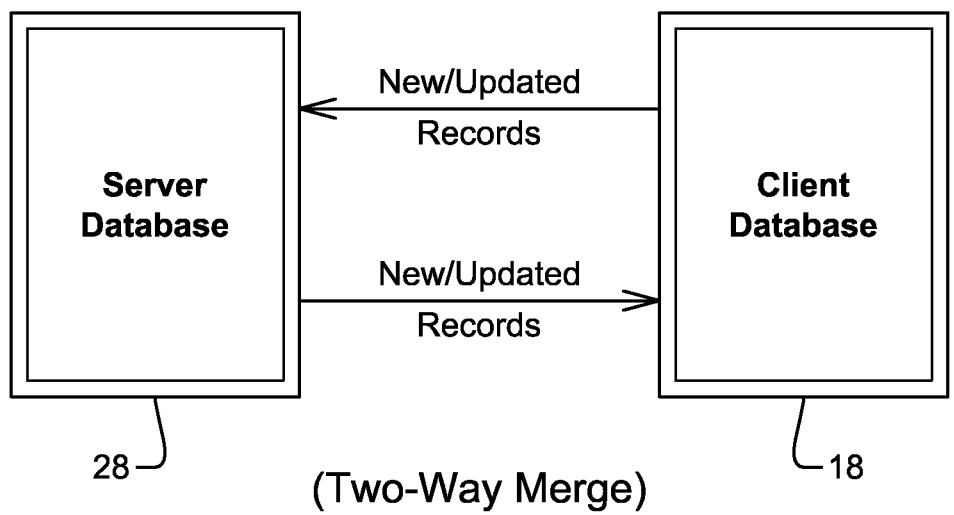
FIG. 3 is a schematic diagram illustrating the merging of two databases with one another (i.e., a two-way merge), according to an embodiment of the invention.

In FIG. 3, the merging of two databases with one another (i.e., a two-way merge) is schematically illustrated. In general, during an exemplary two-way merge procedure, new or updated records are transferred from a client database 18 (residing on one or more of the data storage device(s) 14c of the client computing device 10) to a server database 28 (residing on one or more of the data storage device(s) 24c of the server computing device 20) after it is determined that the server database 28 either does not contain one or more records in the client database 18 or contains an older version of one or more records in the client database 18. Similarly, new or updated records are transferred from the server database 28 to a client database 18 after it is determined that the client database 18 either does not contain one or more records in the server database 28 or contains an older version of one or more records in the server database 28. As described above with regard to the one-way merge, the records transferred between the client and server databases 18, 28 can comprise various forms of data. For example, the records could include any of the following: (i) operator data for an individual conducting subject testing, (ii) anatomical data for a test subject, (iii) numerical data acquired during the testing of a subject, or (iv) a graphical depiction of a test subject. However, one of ordinary skill in the art will readily appreciate that these are merely examples of the type of content which the records may contain. The claimed invention encompasses all possible forms of record content.

Figure 6:
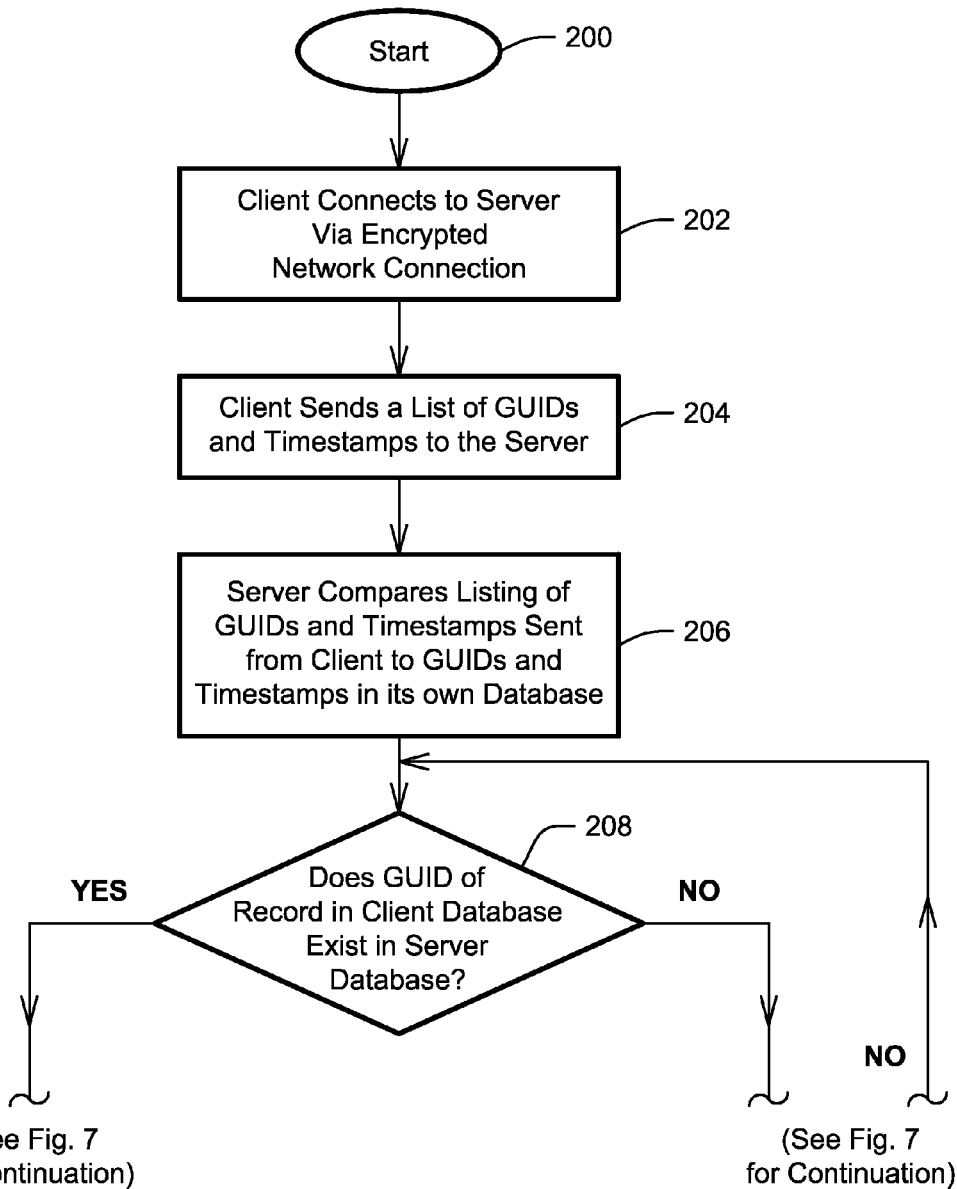
FIG. 6 is a partial flowchart illustrating a two-way merge procedure carried out by the system of FIG. 1, according to an embodiment of the invention.
Figure 7:
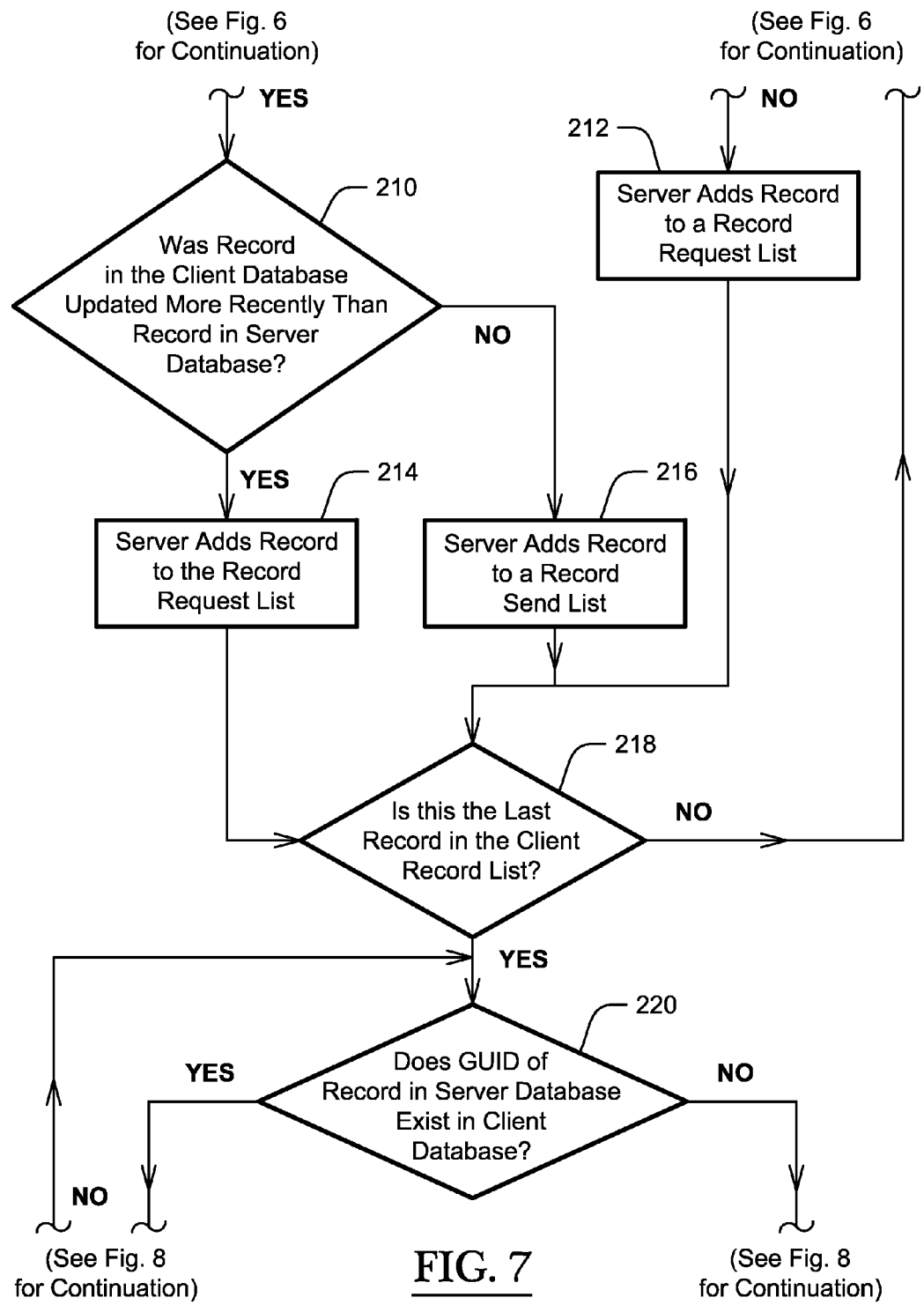
FIG. 7 is a continuation of the flowchart of FIG. 6, which illustrates additional steps of the two-way merge procedure, according to an embodiment of the invention.
Figure 8:
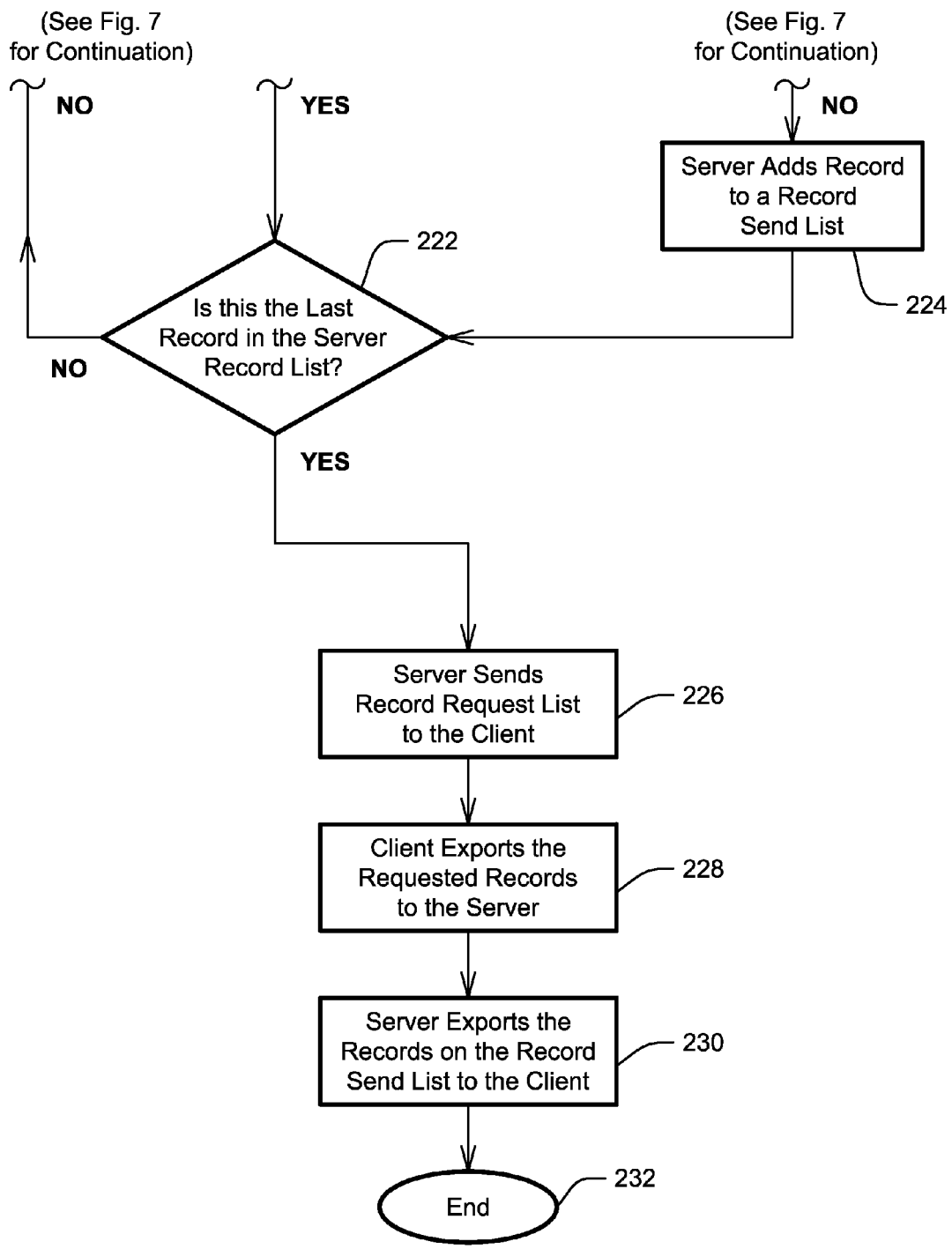
FIG. 8 is a continuation of the flowchart of FIG. 7, which illustrates additional steps of the two-way merge procedure, according to an embodiment of the invention.

In accordance with an embodiment of the invention, a flowchart illustrating a two-way merge procedure carried out by the computer system 50 of FIG. 1 is set forth in FIGS. 6-8. Referring initially to FIG. 6, the procedure commences at 200, and in step 202, the client computing device 10 ("client") connects to the server computing device 20 ("server") via a network connection 30. In a preferred embodiment, the network connection 30 between the client computing device 10 and the server computing device 20 is encrypted so that the data can be securely transmitted between the computing devices 10, 20. As such, confidential or proprietary data can be safely transmitted between the computing devices 10, 20 without the fear of interception by an unauthorized third party. After a network connection is established between the client and the server, the client sends a list of globally unique identifiers (GUIDs) and timestamps, which correspond to the records in its database (i.e., the client database 18), to the server in step 204 of FIG. 6. Then, in step 206, the server compares the listing of globally unique identifiers (GUIDs) and timestamps sent from the client to the listing of globally unique identifiers (GUIDs) and timestamps in its own database (i.e., server database 28).

In step 208 (i.e., decision block 208), the server initially determines whether a GUID identifying a particular record in the client database 18 exists in the server database 28. When it is determined that a GUID identifying a particular record in the client database 18 does not exist in the server database 28, the server adds that record to a record request list (step 212 in FIG. 7). After which, in step 218, the server determines if the record added to the record request list is the last record in the client record list (i.e. the list of records residing in the client database 18). If the record added to the record request list is the last record in the client record list, the process proceeds to step 220 in FIG. 7. Otherwise, the determination in step 208 is performed for the next record in the client record list.

When it is determined that a GUID identifying a particular record in the client database 18 also exists in the server database 28, the server further determines, in step 210, whether the record in the client database 18 was updated more recently than the corresponding record in the server database 28. As described above for the one-way merge procedure, in order to determine which version of a particular record was updated more recently, the timestamps (e.g., expressed in Julian dates) of the two versions of the record are compared to one another. The version of the record having the most recent timestamp associated therewith (e.g., the greatest Julian date value) is deemed to be the record that was most recently updated. When it is determined that the version of the record in the client database 18 has a more recent timestamp, and thus was updated more recently, than the version of the record in the server database 28, the server adds that record to the record request list (step 214 in FIG. 7). After which, in step 218 of FIG. 7, the server determines if the record added to the record request list is the last record in the client record list. If the added record is the last record in the client record list, the process proceeds to step 220 in FIG. 7. Otherwise, the initial determination in step 208 is performed for the next record in the client record list.

On the other hand, when it is determined that the version of the record in the client database 18 has an older timestamp as compared to the version of the record in the server database 28, the process proceeds to step 216 in FIG. 7, wherein the server adds the record to a record send list. Then, in step 218 of FIG. 7, the server determines if the record added to the record send list is the last record in the client record list. If the record added to the record send list is the last record in the client record list, the process proceeds to step 220 in FIG. 7. If not, the initial determination in step 208 is carried out for the next record in the client record list. The aforedescribed process is performed by the server until each of the records in the client record list is evaluated.

After all of the records in the client record list have been evaluated by the server as explained above, the server proceeds with step 220 in FIG. 7. In step 220, the server further determines whether a GUID identifying a particular record in the server database 28 exists in the client database 18. When it is determined that a GUID identifying a particular record in the server database 28 does not exist in the client database 18, the server adds that record to the record send list (step 224 in FIG. 8). After which, in step 222, the server determines if the record added to the record send list is the last record in the server record list (i.e. the list of records residing in the server database 28). If the record added to the record send list is the last record in the server record list, the process proceeds to step 226 in FIG. 8. Otherwise, the determination in step 220 is performed for the next record in the server record list.

In step 220, when it is determined that a GUID identifying a particular record in the server database 28 also exists in the client database 18, the server proceeds with step 222 in FIG. 8, wherein the server determines if the record existing in both databases 18, 28 is the last record in the server record list. If the record existing in both databases 18, 28 is the last record in the server record list, the process proceeds to step 226 in FIG. 8. If not, the determination in step 220 is performed for the next record in the server record list.

After all of the records in the server record list have been evaluated by the server, the server sends the record request list to the client in step 226 of FIG. 8. Subsequently, in step 228, the client exports the requested records to the server utilizing the network connection 30. Then, the server exports the records on the record send list to the client in step 230 of FIG. 8 also using the network connection 30. In a preferred embodiment of the invention, the entire records are exported by both the server and the client in steps 228 and 230, rather than portions of those records. Advantageously, the exportation of the entire records, rather than just mere portions thereof, obviates the need to determine the changed content of each record thereby resulting in a simpler and more streamlined process. Once all of the designated records have been exported from the client to the server, and all of the designated records have been exported from the server to the client, the process ends at step 232.

In a preferred embodiment, the one-way and two-way merge procedures described hereinbefore are user-forced operations. That is, the one-way and two-way merge procedures are initiated by a user (e.g., the user can implement the one-way merge procedure by selecting a "one-way merge" option in the software program, or alternatively, the two-way merge procedure by selecting a "two-way merge" option in the program). In this preferred embodiment, there is no background initiation action by the software program itself.

4. Example of a One-Way Merge Application

Figure 9:
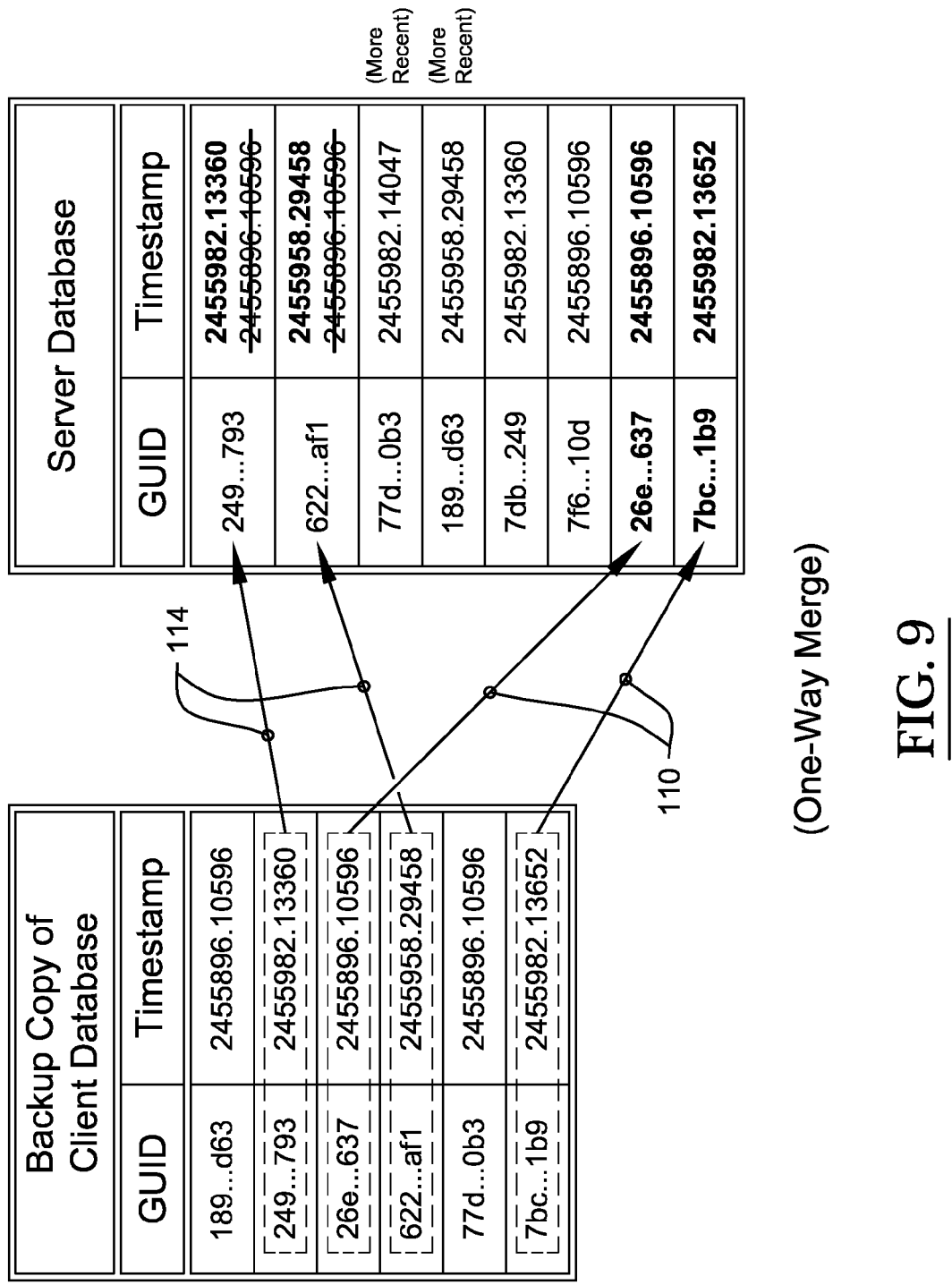
FIG. 9 illustrates an example of the one-way merge procedure for a sample list of records.

FIG. 9 illustrates an example of a one-way merge application carried out by an embodiment of the present invention. In order to facilitate the explanation of the merge processes described herein, the middle characters of the record GUID numbers have been omitted (as indicated by the use of the ellipses) to shorten the overall length of these numbers. However, it is to be understood that the actual GUID numbers used in the database merging system will have a total of 32 characters. Turning to this figure, it is initially determined that the first record in the client database, identified by GUID number "189 . . . d63", also appears in the server database (step 106 in FIG. 4). However, because it is further determined that the version of record number "189 . . . d63" in the backup copy of the client database was not updated more recently than the corresponding record in the server database (step 108 in FIG. 4), the record is not copied to the server database. The most recent version of record number "189 . . . d63" is determined by comparing the Julian date of the record in the client database to the Julian date of the associated record in the server database. In this case, the copy of record number "189 . . . d63" in the client database has a Julian date of "2455896.10596" (corresponding to Wednesday, Nov. 30, 2011 at 14:32:34.9 UT), whereas the copy of the record in the server database has a Julian date of "2455958.29458" (corresponding to Tuesday, Jan. 31, 2012 at 19:04:11.7 UT). Thus, the copy of the record in the server database is more recent than the copy of the record in the client database, so the record is not copied to the server database.

Next, turning to the second record in the client database, which is identified by GUID number "249 . . . 793", it is also determined that a copy of this record additionally appears in the server database (step 106 in FIG. 4). Thus, it is further determined if the backup copy of this record in the client database was updated more recently than the copy in the server database (step 108 in FIG. 4). Unlike the previous record, a comparison of the Julian dates associated with the two versions of record number "249 . . . 793" reveals that the version of the record in the backup copy of the client database was updated more recently (i.e., Julian date "2455982.13360" corresponds to Friday, Feb. 24, 2012 at 15:12:23.0 UT, while Julian date "2455896.10596" corresponds to Wednesday, Nov. 30, 2011 at 14:32:34.9 UT). Consequently, the server copies record number "249 . . . 793" from the backup copy of the client database to the server database (step 114 in FIG. 5), and overwrites the older version of record number "249 . . . 793" in the server database (as indicated by the line through the old timestamp "2455896.10596" in FIG. 9 and the addition of new timestamp "2455982.13360" thereabove).

The fourth record in the client database, which is denoted by GUID number "622 . . . af1" is treated in the same manner as record number "249 . . . 793" because the backup copy of the client database also contains a more recent version of this record (i.e., Julian date "2455958.29458" corresponds to Tuesday, Jan. 31, 2012 at 19:04:11.7 UT, while Julian date "2455896.10596" corresponds to Wednesday, Nov. 30, 2011 at 14:32:34.9 UT). Therefore, as described for record number "249 . . . 793", the server copies record number "622 . . . af1" from the backup copy of the client database to the server database (step 114 in FIG. 5), and overwrites the older version of record number "622 . . . af1" in the server database (as indicated by the line through the old timestamp "2455896.10596" in FIG. 9 and the addition of new timestamp "2455958.29458" thereabove).

Referring again to FIG. 9, it is determined that the third record in the client database, which is denoted by GUID number "26e . . . 637" does not exist at all in the server database (step 106 in FIG. 4). Consequently, the server copies record number "26e . . . 637" from the backup copy of the client database to the server database (step 110 in FIG. 4). Because the sixth record in the client database, namely record number "7bc . . . 1b9", also does not exist in the server database, the server additionally copies this record from the backup copy of the client database to the server database (step 110 in FIG. 4).

Like the first record described above, it is determined that the fifth record in the client database, which is identified by GUID number "77d . . . 0b3", also appears in the server database (step 106 in FIG. 4). As such, it is further determined if the backup copy of this record in the client database was updated more recently than the copy in the server database (step 108 in FIG. 4). In this case, a comparison of the Julian dates associated with the two versions of record number "77d . . . 0b3" reveals that the version of the record in the backup copy of the client database was not updated more recently than the version in the server database (i.e., Julian date "2455896.10596" in the client database corresponds to Wednesday, Nov. 30, 2011 at 14:32:34.9 UT, while Julian date "2455982.14047" in the server database corresponds to Friday, Feb. 24, 2012 at 15:22:16.6 UT). Therefore, as for the first record described above, the version of the record from the backup copy of the client database is not copied to the server database.

5. Example of a Two-Way Merge Application

Figure 10:
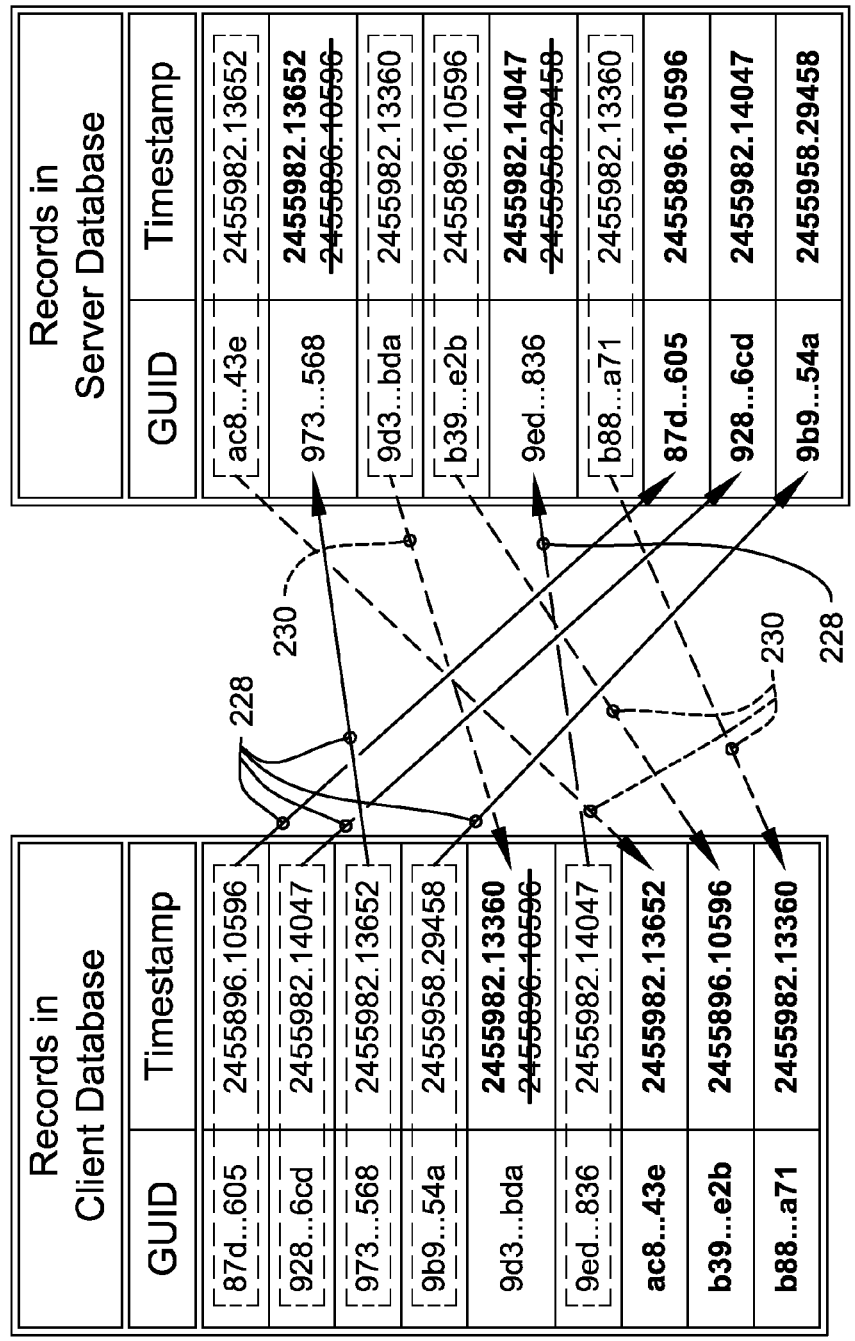
FIG. 10 illustrates an example of the two-way merge procedure for a sample list of records.

FIG. 10 illustrates an example of a two-way merge application carried out by an embodiment of the present invention. Turning to this figure, it is initially determined that the first record in the client database, identified by GUID number "87d . . . 605", does not exist at all in the server database (step 208 in FIG. 6). Consequently, the server adds record number "87d . . . 605" to a record request list (step 212 in FIG. 7), and record number "87d . . . 605" is subsequently exported by the client to the server (in step 228 of FIG. 8) after the client receives the record request list from the server. Because the second and fourth records in the client database, identified by GUID numbers "928 . . . 6cd" and "9b9 . . . 54a" respectively, also do not exist in the server database, the server additionally adds record numbers "928 . . . 6cd" and "9b9 . . . 54a" to the record request list (step 212 in FIG. 7). Then, like record number "87d . . . 605", record numbers "928 . . . 6cd" and "9b9 . . . 54a" are subsequently exported by the client to the server (in step 228 of FIG. 8) after the client receives the record request list from the server.

Next, turning to the third record in the client database, which is identified by GUID number "973 . . . 568", it is determined that a version of this record additionally appears in the server database (step 208 in FIG. 6). Thus, it is further determined if the version of this record in the client database was updated more recently than the version in the server database (step 210 in FIG. 7). The most recent version of record number "973 . . . 568" is determined by comparing the Julian date of the record in the client database to the Julian date of the associated record in the server database. In this case, the version of record number "973 . . . 568" in the client database has a Julian date of "2455982.13652" (corresponding to Friday, Feb. 24, 2012 at 15:16:35.3 UT), whereas the version of this record in the server database has a Julian date of "2455896.10596" (corresponding to Wednesday, Nov. 30, 2011 at 14:32:34.9 UT). Therefore, because the version of the record in the client database is more recent than the version of the record in the server database, the server adds record number "973 . . . 568" to the record request list (step 214 in FIG. 7), and it is subsequently exported by the client to the server (in step 228 of FIG. 8) after the client receives the record request list from the server. After which, the outdated version of the record number "973 . . . 568" on the server is overwritten with the new version of the record from the client database (as indicated by the line through the old timestamp "2455896.10596" in FIG. 10 and the addition of new timestamp "2455982.13652" thereabove). Like record number "973 . . . 568", a version of the sixth record in the client database, which is identified by GUID number "9ed . . . 836", also appears in the server database. As such, it is further determined if the version of this record in the client database was updated more recently than the version in the server database (step 210 in FIG. 7). Similar to record number "973 . . . 568", a comparison of the Julian dates associated with the two versions of record number 9ed . . . 836" reveals that the version of the record in the client database is more recent (i.e., Julian date "2455982.14047" in the client database corresponds to Friday, Feb. 24, 2012 at 15:22:16.6 UT, while Julian date "2455958.29458" in the server database corresponds to Tuesday, Jan. 31, 2012 at 19:04:11.7 UT, signifying that the version of the record in the client database is more recent). Thus, because the version of the record in the client database is more recent than the version of the record in the server database, the server adds record number "9ed . . . 836" to the record request list (step 214 in FIG. 7), and it is subsequently exported by the client to the server (in step 228 of FIG. 8) after the client receives the record request list from the server. The old version of the record number "9ed . . . 836" on the server is overwritten with the new version of the record from the client database (as indicated by the line through the old timestamp "2455958.29458" in FIG. 10 and the addition of new timestamp "2455982.14047" thereabove).

Now, turning to the fifth record in the client database, which is identified by GUID number "9d3 . . . bda", it is determined that a version of this record additionally appears in the server database (step 208 in FIG. 6). Thus, it is further determined if the version of this record in the client database was updated more recently than the version in the server database (step 210 in FIG. 7). In this case, the version of record number "9d3 . . . bda" in the client database has a Julian date of "2455896.10596" (corresponding to Wednesday, Nov. 30, 2011 at 14:32:34.9 UT), whereas the version of this record in the server database has a Julian date of "2455982.13360" (corresponding to Friday, Feb. 24, 2012 at 15:12:23.0 UT). Therefore, because the version of the record in the client database is not more recent than the version of the record in the server database, the server adds record number "9d3 . . . bda" to the record send list (step 216 in FIG. 7), and it is subsequently exported by the server to the client (in step 230 of FIG. 8). After which, the outdated version of the record number "9d3 . . . bda" on the client is overwritten with the new version of the record from the server database (as indicated by the line through the old timestamp "2455896.10596" in FIG. 10 and the addition of new timestamp "2455982.13360" thereabove).

Finally, turning to the server database in FIG. 10, it is initially determined that the first record in the server database, identified by GUID number "ac8 . . . 43e", does not exist at all in the client database (step 220 in FIG. 7). Consequently, the server adds record number "ac8 . . . 43e" to a record send list (step 224 in FIG. 8), and record number "ac8 . . . 43e" is subsequently exported by the server to the client (in step 230 of FIG. 8). Because the fourth and sixth records in the server database, identified by GUID numbers "b39 . . . e2b" and "b88 . . . a71" respectively, also do not exist in the client database, the server additionally adds record numbers "b39 . . . e2b" and "b88 . . . a71" to the record send list (step 224 in FIG. 8). Then, like record number "ac8 . . . 43e", record numbers "b39 . . . e2b" and "b88 . . . a71" are subsequently exported by the server to the client (in step 230 of FIG. 8).

Advantageously, the system and method for the merging of databases described herein is not concerned with the inherent clock drift that is experienced by computing devices. Considering that virtually all modern computing systems automatically synchronize their own clocks, any residual clock drift after synchronization will be so miniscule in nature that it will have no appreciable effect on the merging of the database records explained hereinbefore. Thus, the present invention can be employed on computing systems which use standard methods to automatically synchronize their clocks. Moreover, the system and method for the merging of databases described herein advantageously does not require the use of a transaction, activity, or history log in a separate file, which would undesirably add to the overall complexity of the merging procedure. Furthermore, advantageously the system and method for the merging of databases hereinbefore explained does not rely upon any centralized database, nor does it employ any type of scripting or business logic. The present system for the merging of databases always operates in a synchronous mode, and utilizes single peer-to-peer communication without the need for any type of master server device. Also, while the merge processes are being carried out, the updating of the data in the client database 18 and the server database 28 is not permitted.

In addition, the aforedescribed system and method for the merging of databases provides a great deal of flexibility in the connectivity of the computer system, wherein individual computers in the system can be connected on an ad hoc basis to merge the database results when needed, with no requirements for the availability of a continual network connection.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A method for merging two databases, the method comprising the steps of:

providing first and second computing devices having respective first and second databases stored thereon, the first and second databases each comprising one or more records containing data, each of the one or more records having a unique identifier and a timestamp associated therewith;

operating the second computing device in a one-way merge mode, wherein the first database is merged with the second database by utilizing removable electronic media or a shared device to make a copy of the first database available to the second computing device;

performing the following steps when operating the second computing device in the one-way merge mode:

making the copy of the first database available to the second computing device using the removable electronic media or the shared device so that the second computing device is capable of reading the first database;

comparing, by using the second computing device, a first listing of one or more unique identifiers and timestamps associated with the one or more records in the first database to a second listing of one or more unique identifiers and timestamps associated with the one or more records in the second database without checking the data in each of the one or more records for conflicts and without using a transaction or activity log;

determining, by using the second computing device, whether each of the one or more unique identifiers in the first listing exists in the second listing;

when it is determined that one or more unique identifiers in the first listing do not exist in the second listing, copying one or more records associated with the one or more unique identifiers that do not exist from the first database to the second database;

when it is determined that one or more unique identifiers in the first listing also exist in the second listing, further determining, by using the second computing device, a most recent version of one or more records associated with the one or more unique identifiers existing in both listings by comparing one or more timestamps in the first listing to one or more timestamps of one or more corresponding records in the second listing, wherein the one or more timestamps of each of the one or more records having common unique identifiers are compared only once during the one-way merge mode from the beginning of the one-way merge mode to the end of the one-way merge mode; and when it is determined that one or more records in the first listing have a more recent timestamp than one or more corresponding records in the second listing with matching unique identifiers, copying the one or more records having more recent timestamps from the first database to the second database without first checking the data in each of the one or more records for conflicts;

determining whether each of the one or more records in the first listing is a last remaining record in the first listing; and operating the second computing device in a two-way merge mode, wherein the first and second databases are merged with one another by utilizing a network connection to operatively connect the first and second computing devices to each other;

performing the following steps when operating the second computing device in the two-way merge mode:

connecting the first computing device with the second computing device by utilizing the network connection;

sending a first listing of one or more unique identifiers and timestamps associated with the one or more records in the first database from the first computing device to the second computing device;

comparing, by using the second computing device, the first listing of the one or more unique identifiers and timestamps associated with the one or more records in the first database to a second listing of one or more unique identifiers and timestamps associated with the one or more records in the second database without checking the data in each of the one or more records for conflicts and without using a transaction or activity log;

determining, by using the second computing device, whether each of the one or more unique identifiers in the first listing exists in the second listing, and whether each of the one or more unique identifiers in the second listing exists in the first listing;

when it is determined that one or more unique identifiers in the first listing do not exist in the second listing, adding the one or more unique identifiers that do not exist to a record request list;

when it is determined that one or more unique identifiers in the first listing also exist in the second listing, further determining, by using the second computing device, a most recent version of one or more records associated with the one or more unique identifiers existing in both listings by comparing one or more timestamps in the first listing to one or more timestamps of one or more corresponding records in the second listing, wherein the one or more timestamps of each of the one or more records having common unique identifiers are compared only once during the two-way merge mode from the beginning of the two-way merge mode to the end of the two-way merge mode;

when it is determined that one or more records in the first listing have a more recent timestamp than one or more corresponding records in the second listing with matching unique identifiers, adding one or more unique identifiers corresponding to the one or more records having more recent timestamps to the record request list without first checking the data in each of the one or more records for conflicts;

when it is determined that one or more records in the second listing have a more recent timestamp than one or more corresponding records in the first listing with matching unique identifiers, adding one or more unique identifiers corresponding to the one or more records having more recent timestamps to a record send list;

when it is determined that one or more unique identifiers in the second listing do not exist in the first listing, adding the one or more unique identifiers that do not exist to the record send list;

determining whether each of the one or more records in the first listing is a last remaining record in the first listing, and whether each of the one or more records in the second listing is a last remaining record in the second listing;

transferring the record request list from the second computing device to the first computing device;

exporting the one or more records listed on the record request list from the first computing device to the second computing device; and exporting the one or more records listed on the record send list from the second computing device to the first computing device.

2. The method according to claim 1, further comprising the step of:

utilizing the first computing device for making a backup copy of the first database, the first computing device storing the backup copy of the first database on the removable electronic media or the shared device.

3. The method according to claim 1, wherein the one or more unique identifiers comprise one or more globally unique identifiers.

4. The method according to claim 3, wherein the one or more globally unique identifiers are expressed in a numerical or alpha-numerical notation for encoding binary data.

5. The method according to claim 3, wherein the one or more globally unique identifiers comprise one of the following: (i) one or more mathematically random numbers, (ii) one or more mathematically pseudo-random numbers, and (iii) one or more heuristic values based upon content in fields of the one or more records.

6. The method according to claim 1, wherein the one or more timestamps comprise both the dates and times when the one or more records were last modified.

7. The method according to claim 6, wherein the one or more timestamps are expressed in the form of Julian dates.

8. The method according to claim 1, wherein the first computing device is a client computing device and the second computing device is a server computing device.

9. A system for merging two databases, the system comprising:
first and second computing devices, each of the first and second computing devices including a microprocessor and memory, the first and second computing devices having respective first and second databases stored thereon, the first and second databases each comprising one or more records containing data, each of the one or more records having a unique identifier and timestamp associated therewith;
removable electronic media or a shared device configured to make a copy of the first database available to the second computing device so that the second computing device is capable of reading the first database;
the second computing device being specially programmed to operate in both of the following two modes: (i) a one-way merge mode, wherein the first database is merged with the second database by utilizing the removable electronic media or the shared device to make the copy of the first database available to the second computing device; and (ii) a two-way merge mode, wherein the first and second databases are merged with one another by utilizing a network connection to operatively connect the first and second computing devices to each other;
the second computing device being specially programmed to carry out the following operations in the one-way merge mode:
compare a first listing of one or more unique identifiers and timestamps associated with the one or more records in the first database residing on the removable electronic media or the shared device to a second listing of one or more unique identifiers and timestamps associated with the one or more records in the second database without checking the data in each of the one or more records for conflicts and without using a transaction or activity log;
determine whether each of the one or more unique identifiers in the first listing exists in the second listing;
when it is determined that one or more unique identifiers in the first listing do not exist in the second listing, copy one or more records associated with the one or more unique identifiers that do not exist from the first database to the second database;
when it is determined that one or more unique identifiers in the first listing also exist in the second listing, further determine a most recent version of one or more records associated with the one or more unique identifiers existing in both listings by comparing one or more timestamps in the first listing to one or more timestamps of one or more corresponding records in the second listing, wherein the one or more timestamps of each of the one or more records having common unique identifiers are compared only once during the one-way merge mode from the beginning of the one-way merge mode to the end of the one-way merge mode; and
when it is determined that one or more records in the first listing have a more recent timestamp than one or more corresponding records in the second listing with matching unique identifiers, copy the one or more records having more recent timestamps from the first database to the second database without first checking the data in each of the one or more records for conflicts;
determining whether each of the one or more records in the first listing is a last remaining record in the first listing; and
the second computing device being specially programmed to carry out the following operations in the two-way merge mode:
compare a first listing of the one or more unique identifiers and timestamps associated with the one or more records in the first database to a second listing of one or more unique identifiers and timestamps associated with the one or more records in the second database without checking the data in each of the one or more records for conflicts and without using a transaction or activity log, the first listing being sent from the first computing device to the second computing device via the network connection;
determine whether each of the one or more unique identifiers in the first listing exists in the second listing, and whether each of the one or more unique identifiers in the second listing exists in the first listing;
when it is determined that one or more unique identifiers in the first listing do not exist in the second listing, add the one or more unique identifiers that do not exist to a record request list;
when it is determined that one or more unique identifiers in the first listing also exist in the second listing, further determining a most recent version of one or more records associated with the one or more unique identifiers existing in both listings by comparing one or more timestamps in the first listing to one or more timestamps of one or more corresponding records in the second listing, wherein the one or more timestamps of each of the one or more records having common unique identifiers are compared only once during the two-way merge mode from the beginning of the two-way merge mode to the end of the two-way merge mode;
when it is determined that one or more records in the first listing have a more recent timestamp than one or more corresponding records in the second listing with matching unique identifiers, add one or more unique identifiers corresponding to the one or more records having more recent timestamps to the record request list without first checking the data in each of the one or more records for conflicts;
when it is determined that one or more records in the second listing have a more recent timestamp than one or more corresponding records in the first listing with matching unique identifiers, add one or more unique identifiers corresponding to the one or more records having more recent timestamps to a record send list;
when it is determined that one or more unique identifiers in the second listing do not exist in the first listing, add the one or more unique identifiers that do not exist to the record send list;
wherein, when operating in the two-way merge mode, the second computing device is configured to determine whether each of the one or more records in the first listing is a last remaining record in the first listing, and whether each of the one or more records in the second listing is a last remaining record in the second listing;
wherein, when operating in the two-way merge mode, the second computing device is configured to transfer the record request list to the first computing device; and wherein, when operating in the two-way merge mode, the first computing device is configured to export the one or more records listed on the record request list to the second computing device, and the second computing device is configured to export the one or more records listed on the record send list to the first computing device.

10. The system according to claim 9, wherein the second computing device is additionally programmed to enable a system user to selectively choose between the one-way merge mode and the two-way merge mode.

* * * * *